US007233990B1

(12) United States Patent
Debaty et al.

(10) Patent No.: US 7,233,990 B1
(45) Date of Patent: Jun. 19, 2007

(54) FILE PROCESSING USING MAPPING BETWEEN WEB PRESENCES

(75) Inventors: Philippe Debaty, Mountain View, CA (US); Patrick M. Goddi, San Jose, CA (US); William Alex Vorbau, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 733 days.

(21) Appl. No.: 10/347,999

(22) Filed: Jan. 21, 2003

(51) Int. Cl.
  *G06F 15/173* (2006.01)
  *G06F 15/16* (2006.01)
(52) U.S. Cl. .................. 709/224; 709/208; 709/223; 709/226
(58) Field of Classification Search ........ 709/217–219, 709/223–225, 203, 208, 226
See application file for complete search history.

(56) References Cited

U.S. PATENT DOCUMENTS

| 5,862,321 | A  | * | 1/1999 | Lamming et al. ........... 709/200 |
| 6,047,327 | A  | * | 4/2000 | Tso et al. .................. 709/232 |
| 6,119,155 | A  | * | 9/2000 | Rossmann et al. .......... 709/219 |
| 6,201,611 | B1 | * | 3/2001 | Carter et al. ............... 358/1.15 |
| 6,421,716 | B1 | * | 7/2002 | Eldridge et al. ............ 709/219 |

* cited by examiner

*Primary Examiner*—Ario Etienne
*Assistant Examiner*—Hussein El-chanti (57) ABSTRACT

Using a web presence manager infrastructure (see Appendix), actions, appliance events, and presences are continuously and automatically captured and stored as historical metadata for each physical context managed. The metadata is mapped interactively for all users. Personal content for each user, such as digital file usage, is indexed in association with each physical context. Users personal content from autobiographical web presence manager past events is displayed upon each registration of the user's presence in a current physical context with content recall directly related to the current physical context. Personal content mapping to available services is also provided.

4 Claims, 8 Drawing Sheets

FILE PROCESSING USING MAPPING BETWEEN WEB PRESENCES

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

This application includes a hard copy Appendix in the format of pertinent sections of a utility patent application specification and drawings, designated pages -5- through -17-, U.S. application Ser. No. 10/192,487, and FIG. 1 through FIG. 4.

BACKGROUND

1. Technology Field

The present invention relates generally to virtual representation technology. As used herein, "internet" shall be used as a generic term for any collection of distributed, interconnected networks (ARPANET, DARPANET, World Wide Web (hereinafter web), or the like) that are linked together by a set of industry standard protocols (e.g., TCP/IP, HTTP, and the like) to form a global or sub-global distributed network; an "intranet" is a proprietary network having similar properties to which the present invention may be adapted.

2. Description of Related Art

Currently an internet user's personal content is some combination of digital data files—that may include information data, pictures, video clips, presentations, electronic books, digital music, and the like—and the user's generally random and unorganized interactions therewith. A user's personal content grows at a rapid rate. Organization of and access to personal content becomes a significant issue.

In the state-of-the-art, the user's experience of internet-relational, mobile computing consists largely of being able, as examples, to listen to an MP3 song, read e-mail, or browse the web from a laptop computer, personal digital assistant (PDA), mobile telephone, or the like, referred to hereinafter generically as "mobile devices." Even the most mundane of these activities are frequently hampered by the need for making configuration settings, waiting for connections, losing wireless connection signals and starting over, and the like, even when the action desired by the user is similar to a previous mobile computing experience.

An advancement to the state-of-the-art is to have task-focused, sensor-enhanced, mobile devices that have tools for capturing some type of data or content from the physical world. For example, a PDA might be enhanced by addition of data capture tools, e.g., sensors such as an optical tag compatible subsystem—generally known as a barcode reader—an infrared receiver, a contact tag, a Radio Frequency Identification (RFID) tag reader, a position locator—such as Global Positioning System (GPS)—a camera, a handheld scanner, environmental condition detectors, a microphone and recording memory, or the like. Identifiers compatible with these capture tools, e.g., bar codes, beacons—namely, a transmitter of an identifier signal, e.g. Uniform Resource Locator (URL), over a short range via an infrared, wireless, or the like mechanism—and the like, are provided to be extracted from, attached to, or be near, associated physical objects. The capture tool obtains the identifier. The device resolves the identifier into a virtual resource or action related to the associated physical object. The result of resolution of an identifier may be information, e.g., a web page, or a service provided to the device user, or an action in the local physical environment. Provided with an appropriate infrastructure, mobile device users now automatically can find specific single web links by sensing something in the physical world; i.e., these enhanced mobile computing solutions use an iconic physical interface sensed by a sensor-enhanced mobile device and mapped by network software to a name for a contextual action associated with the current need. Examples are described by J. Barton and T. Kindberg in HPL-2001-18 Technical Report, titled "The Challenges and Opportunities of Integrating the Physical World and Network Systems," Jan. 24, 2001, discussing physical entities, virtual entities, and network-based linage mechanisms between them, whereby users engage simultaneously in mobile computing and their familiar physical world. The ability to resolve identifiers should be ubiquitous in that users should be able to pick up identifiers and, as long as they are connected to a wireless network, have the identifiers resolved. Examples of identifier resolution are described by T. Kindberg in HPL-2001-95 Technical Report, titled "Ubiquitous and Contextual Identifier Resolution for the Real-world Wide Web," Apr. 18, 2001, revised as HPL-2001-95R1 Technical Report, titled "Implementing Physical Hyperlinks Using Ubiquitous Identifier Resolution," Mar. 26, 2002, focusing on choices for identifier encoding and associated contextual parameters. These reports are available at the Hewlett-Packard Company web site. Such smart space systems further complicate the issue of use and query of personal content in relation to current physical context. Web servers may now be embedded in appliances in order to render them compliant with smart space environments; for example, see U.S. Pat. No. 6,139,177 (assigned to the common assignee herein).

In the current computer-centric paradigm, a user can only use resources and services installed and available on his computer to process his files. For instance, to print a file, a driver code needs to be installed beforehand on the computer for each printer that is to be a peripheral resource of the computer.

BRIEF SUMMARY OF THE INVENTION

The present invention provides a method and apparatus for enabling a user to receive views of their content organized by relevancy to current physical context and defining a service-oriented and user-centric model, methodology, and system for implementing actions in the current physical context.

The foregoing summary is not intended to be inclusive of all aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

BRIEF DESCRIPTION OF THE DRAWINGS

In order to distinguish the drawings of the present application from the drawings associated with the Appendix hereto, alphabetic letter and number combinations are used for the present application.

FIGS. 1A, 1B, and 1C are related process flowcharts for an exemplary embodiment of the present invention in which:

Like reference designations represent like features throughout the drawings. Reference numbers used hereinafter start with the number 1000 and use numbers identical to the Appendix only when appropriate within the context. The drawings referred to in this specification should be understood as not being drawn to scale except if specifically annotated.

DETAILED DESCRIPTION OF THE INVENTION

The Appendix hereto, certain pages of the specification (without claims), and drawings for U.S. patent application Ser. No. 10/192,487, filed Jul. 10, 2002, for a "Web Presence for Physical Entities" details a web presence system and management scheme. This system scheme is usable with a "smart space" environment as described in the Background section hereinabove.

Figure 1A:
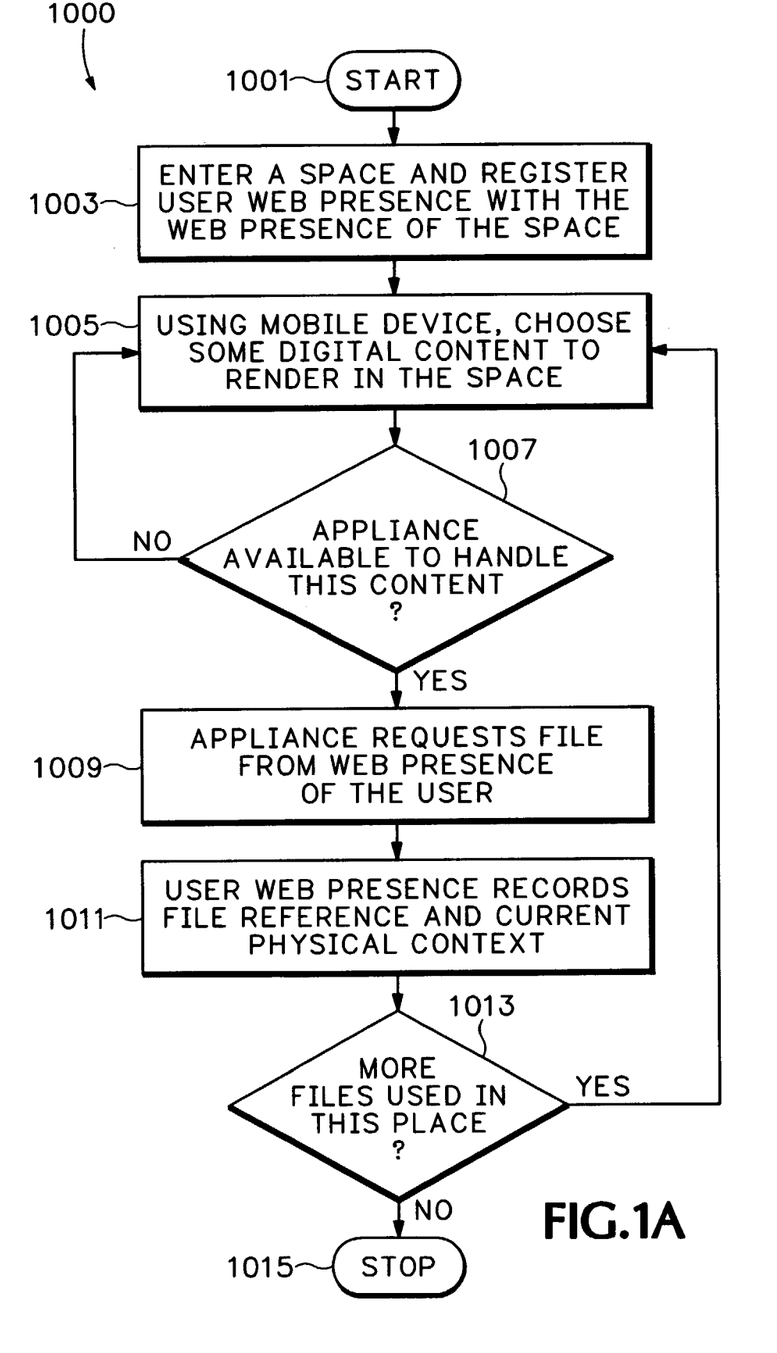
FIG. 1A is an exemplary embodiment subprocess for creating a history of related context and content events.

FIG. 1A is a flowchart showing a method 1000 for enabling a mobile device user to record his current interaction with a smart space web presence running anywhere on the network within an instance of a web presence manager ("WPM") program in order that a personal content history is created, organized associatively to a current, smart space, physical environment—e.g., a particular smart room of his home—referred to hereinafter generically as a "physical context." In essence, the user creates an autobiography of his interaction with each such smart space.

Assume that to initiate web interaction, the user activates—shown in this flowchart as "start" 1001—an enhanced mobile device, e.g., a ENHANCED-PDA. Assume that the physical context, e.g., the mentioned room, is a smart space associated with a web presence manager as described in the Appendix—therein also called the "execution environment 10". By "associated" it is meant generally in accordance with the Background hereinabove that in such a smart space, physical entities have an internet-based interface and accept references—URLs between web present physical entities—as part of their interface interactions; references to users' may be set to local devices for rendering actions. An internet-enabled device—e.g., an audio-visual system having internet interface capability and processing application specific integrated circuit (ASIC)—becomes responsible for retrieving the content referenced by the URL and rendering it. The location of the content may be on a server or service on the internet or it may be on an appliance carried by the user that has both storage and web server capability. In current implementations, the content resides on a web service which may be hosted in the user's home or by an ISP. References to content that are passed to the room's devices then request the content from this web service. For example, a URL for a particular song can be sent to a web-enabled audio-visual system requesting the song be played. The URL will reference a known manner content management service—e.g., a plug-in module as would be known in the art—and the audio-visual system request the file from the content management service.

In other words, the web presence manager infrastructure is a virtual world emulating associated persons, places, things, and events of the physical world. Interaction between the two worlds is facilitated by the present invention in the exemplary embodiments described herein.

Figure 2A:
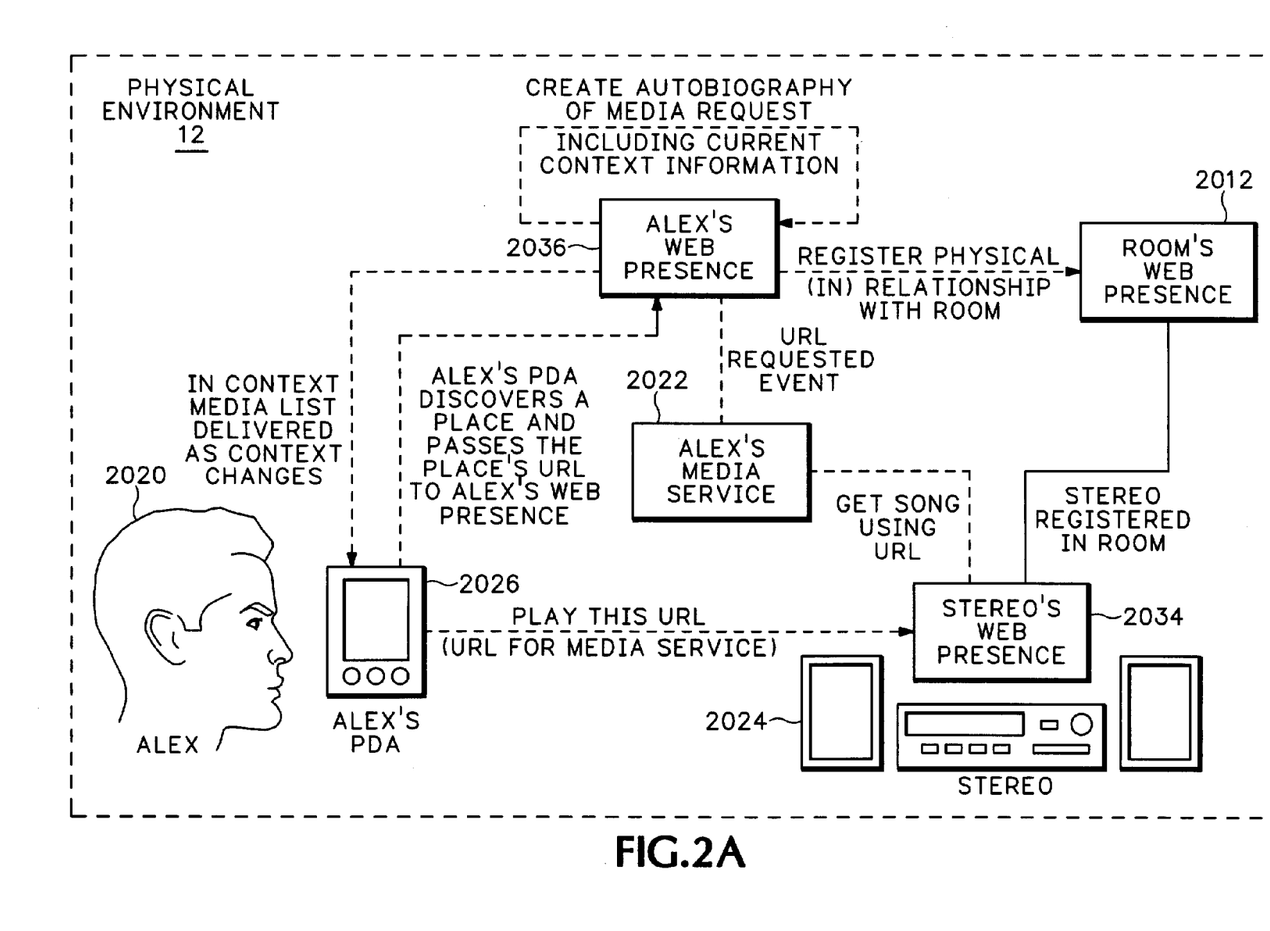
FIG. 2A is a schematic depiction of appliances, events, and actions associated with the process as shown in FIGS. 1A, 1B, and 1C.

Turning briefly to FIG. 2A, an exemplary embodiment is schematically depicted for a physical context, room 12 (see also Appendix, FIG. 1), with a user "Alex" 2020 and his enhanced device, PDA 2026. The room 12 has a web presence ("WP") 2012, Alex 2020 has "Alex's web presence" 2036, and a stereo system 2024 in the room has a web presence 2034 (see also, e.g., Appendix, elements 30–32). The ENHANCED-PDA 2026, and Alex as Alex's web presence 2036, is also shown as associated, e.g., over the web, with a media service 2022. In a basic aspect, the PDA 2026 becomes a remote control for the smart environment; it picks up the local environment's beacons and forwards them to the users web presence, in this case "Alex's web presence" 2036 residing on the web. In general, the physical context may include a wide variety of information in and regarding the local environment, including anything available regarding the location, people present, appliances present, mobile devices and appliances in use, and relational sensor readings, e.g., fixed locale beacons, or the like.

Returning simultaneously to FIG. 1A, again the goal is to enable a person to record and receive electronic data, e.g., a ENHANCED-PDA screen view, of their personal content organized by relevancy to the current physical context. A capability in accordance with the embodiments of the present invention is provided for recording "snapshots" of the current physical context during interaction therewith, recording these context-related personal content "snapshots" in a manner to enhance future availability and retrieval.

Accordingly, as the user 2020 enters a current smart space 12, their web presence 2036 is registered with the current physical context's web presence 2012; flowchart element 1003. In other words, the mobile device, Alex's ENHANCED-PDA 2026, being on 1001, "discovers" the current room 12 via a beacon, or the like, (see Background section) and passes the room's identity, e.g., internet Universal Resource Locator, or the like, to Alex's web presence 2036. See also FIG. 2A, phantom-arrow labeled "Alex's ENHANCED-PDA discovers a place, and passes the place's URL to Alex's WP." The physical relationship of Alex in the room 12 is registered, represented by the phantom-arrow labeled "Register physical (IN) relationship with room."

The room's web presence 2012 has been pre-associated with the room's stereo 2024 and stereo web presence 2034 as represented by the solid line labeled "stereo registered IN room." Many more internet interface equipped items may be similarly associated with the room's web presence 2012. This facet is described in detail in the Appendix hereto and also with respect to FIG. 3A hereinafter.

Next, assume a content request is generated by the user via the ENHANCED-PDA 2026; flowchart element 1005. Alex 2020 chooses some digital content to render in the space 12, for example selecting a song that he wishes to hear on the stereo 2024. This is shown in FIG. 2A by the phantom arrow labeled "Play this URL (URL for media services)" emanating from the ENHANCED-PDA 2026. In other words, the users' web presence provides the user with a web page that lists the user's content. Next to each content item is an icon that represents one or more local appliances that can handle this type of content. If no appropriate appliances exist, no icons are displayed next to the item of content, element 1007, NO-PATH. Thus, for purposes of the operational flow chart, a decision is made if an actual appliance is available to handle the content rendering requested in the current. In the present example as shown in FIG. 2A, this will be known from the associated stereo web presence 2034 and room's web presence 2012. Note that other content and appliance indicators besides icons, such as list or an appropriate message to the ENHANCED-PDA 2026, e.g., "NOT AVAILABLE IN CURRENT LOCALE" may be employed. If apparatus is available, the ENHANCED-PDA 2026 is used to make requests from the appropriate file from the user's media service, illustrated in FIG. 2A by the phantom line labeled "Get song using URL." Assuming a choice, e.g., "PLAY BEATLES' SONG NAMED 'LET IT BE'," is valid for the current physical context, element 1007, YES-path, (see also FIG. 2A, dotted-line connections between Alex's web presence 2036 and Alex's media service 2022 and the stereo's web presence 2034 ("URL requested event" and "Get song using URL"), the ENHANCED-PDA 2026 can issue the requested file URL to the stereo's web presence 2034—FIG. 1A, element 1009—and have the song LET IT BE played in the room 12 by the stereo 2024.

The capture and storage of physical context information at the time digital content is used with the local appliances is recorded as autobiographical metadata for Alex's web presence 2036, FIG. 1A, element 1011. That is, Alex's web presence 2036 also creates a historical record of the place and event with a timestamp type chronology marker. As shown in FIG. 2A by phantom-arrow feedback loop labeled "create autobiography of media request including current context information," a correlated data set is created. Using the same example, showing the song LET IT BE was requested at a given time and date in room 12 by Alex 2020 via his ENHANCED-PDA 2026. That metadata is now available and can be used to organize that content later into views based on the physical context or content query. Note that alternatively, the capture and storage of current physical context and the use of content may be distributed and through the use of timestamps, an analysis module could reconcile the context information at a later time. Any event associated with the web presence manager or managers in operation can be so captured and recorded. It may be noted here also that each web presence may be provided separately, such as an original equipment manufacturer (OEM) offering a web presence adjunct to the hardware itself; e.g., a Hewlett-Packardt™ LaserJet™ multifunctional office equipment might be sold with an on-board program (e.g., in an application specific integrated circuit (ASIC)) or internet-based support program for the equipment to maintain an associated web presence integrated into a web presence management infrastructure. Other internet or intranet support can be implemented in accordance with the state of the art and specific design criteria.

Returning to FIG. 1A, a loop is provided to capture and record each of the events in the current physical context, shown as element 1013, YES-path. As long as the user remains in the current physical context, each such event, action, presence of other users, beacons, and available appliance recognition (generally referred to hereinafter as simply "events") can be monitored and recorded to supplement the user's personal content. Note again, that any device, such as a smart badge worn by the user can be used to register personal presence in the smart environment.

Continuing the same example of Alex and music selections, assume Alex exits and then at a later time re-enters the same physical context. Content is generated via relational events in the environment. therefore, the user's web presence determines where the user is, who else is present, and brings up autobiographical data for similar circumstances in the past. A list of content is then created relationally. For example, Alex has a content list of music played on the stereo system 2024 for this room 12, so knowing what room Alex has entered, Alex's web presence 2036 may automatically deliver an in-physical context content list for that room to his ENHANCED-PDA 2026 (see also FIG. 2A, labeled phantom-arrow labeled "In context media list delivered as context changes." Therefore, as Alex 202 moves between smart rooms, such content representations on the ENHANCED-PDA's screen may be automatically changed, reflecting the prior content for the same space. For example, the list for room 12 could include "PLAY MUSIC." Note that more generically the ENHANCED-PDA may be programmed to self-determine whether a content rendering request is appropriate.

Importantly, provision is made for specific queries into the personal content metadata. Continuing the same example, Alex recalls that when in the current smart room 12 last September music was playing, but Alex can not remember what it was. Using the ENHANCED-PDA 2026, he queries his personal content for the current physical context and time period. Alex's web presence returns the appropriate information, e.g., "BEATLES' 'LET IT BE'."

Figures 1B, 1C:
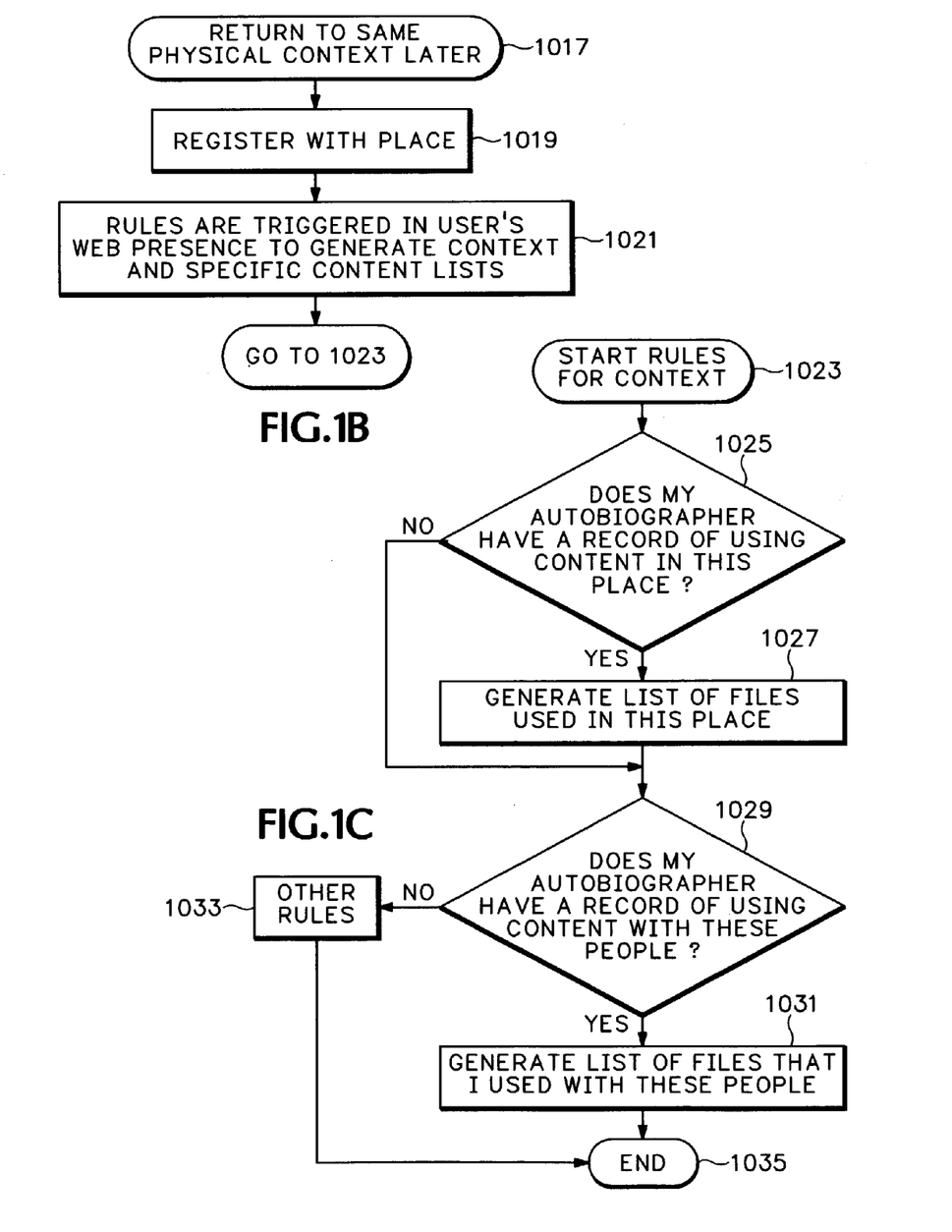
FIG. 1B is an exemplary embodiment subprocess for triggering retrieval of a history of related context and content events as created in FIG. 1A.
FIG. 1C is an exemplary embodiment subprocess for retrieving historical metadata according to exemplary rules triggered by the subprocess of FIG. 1B.

These mobile device views based on physical context so created may be organized in any manner appropriate to a particular web presence manager implementation. For example, a set of hierarchical lists that contain content references associated with a particular physical context may be generated. Assume again, that the user, Alex 2020, leaves room 12. Therefore, no more capture and storage of events are occurring in that physical context, room 12—represented in FIG. 1A by the STOP terminator 1015. When Alex 2020 at a later time re-enters the particular physical context, represented by element 1017 in FIG. 1B, and re-register's a current presence there, 1019 (see also element 1003), a home page for that physical context may appear, defining available resources. The user than begins recording each new event. Alternatively, association rules may be automatically triggered 1021 in Alex's web presence 2036 to generate a physical context, specific personal content view immediately upon registering person presence in the smart space. Note that provision can be made for customizing association rules for each user and personal mobile device.

That is, different users may have different purposes in mind for their autobiographical content. On the other hand, the autobiographical data associated with each physical context may be more general and ubiquitous, keeping a listing, log, or the like data sets, of each and every event recordable.

Generically, the data and metadata process is automated via the web presence manager, but rules for operation may be tailored to any specific implementation. Each user's web presence 2036 maintains the autobiography of all events— see FIG. 2A feedback, "create autobiography . . . ". Depending on the current physical context, that locale's rules are implemented, FIG. 1C, element 1023. A determination is made as to whether the autobiographical data has any record of content events related to the physical context. To continue the same example, a determination is made as to whether there is past data related to room 12 for Alex's web presence 2036, FIG. 1C, 1025. If so, 1025, YES-path, a view is generated 1027; e.g., a list of songs previously requested there. As another exemplary rule, another determination 1029 might be whether there is a record of the same other parties who are currently present recognized by Alex's web presence 2036 (e.g., via beacons; see Background section). If so, 1029, YES-path, content used with those parties may be generated as a view, 1031. Other rules 1033 specific to a particular web presence manager are similarly reviewed for current context content prior uses until the rules are exhausted or stop, shown in FIG. 1C as "END" 1035.

In a preferred embodiment, when a user enters a physical context and his mobile device connects to the web presence manager associated with both, his registration triggers a rule that simply gets a view, such as a text screen on the ENHANCED-PDA, showing at least a current physical context home page. All relational, historical, personal content metadata for that physical context is included. Users typically use different subsets of their content with different people; business related digital content with co-worker in an office versus music content with friends in a social setting, although there may be overlap. Therefore, provision of search algorithms available from the mobile device are provided. For example, when Alex enters his office using his enhanced-ENHANCED-PDA he may receive a smart screen saying:

"Alex, you are in YOUR OFFICE and Phillipe, Nic and Jane are present.

"Files used with these people are: song(s) BEATLES': LET IT BE, A DAY IN THE LIFE; MILES DAVIS' KIND OF BLUE; video(s) CHRISTMAS01.mpg, MOM&DAD01.mpg.

"Files used in this place are: song(s) BEATLES': LET IT BE, A DAY IN THE LIFE; MILES DAVIS' KIND OF BLUE; video(s) CHRISTMAS)01.mpg, MOM&DAD01.mpg; WORD computer files 123, 333, and 456.

"Files used in similar places: songs(s) NONE; video(s) NONE; WORD computer files 123 and 456."

Similarly, an alternative, graphical user interface showing appliances present and web-enabled in the current physical context along with the personal content of the individual user may be displayed on the mobile device screen for a more pleasing or user-friendly implementation.

Figure 3A:
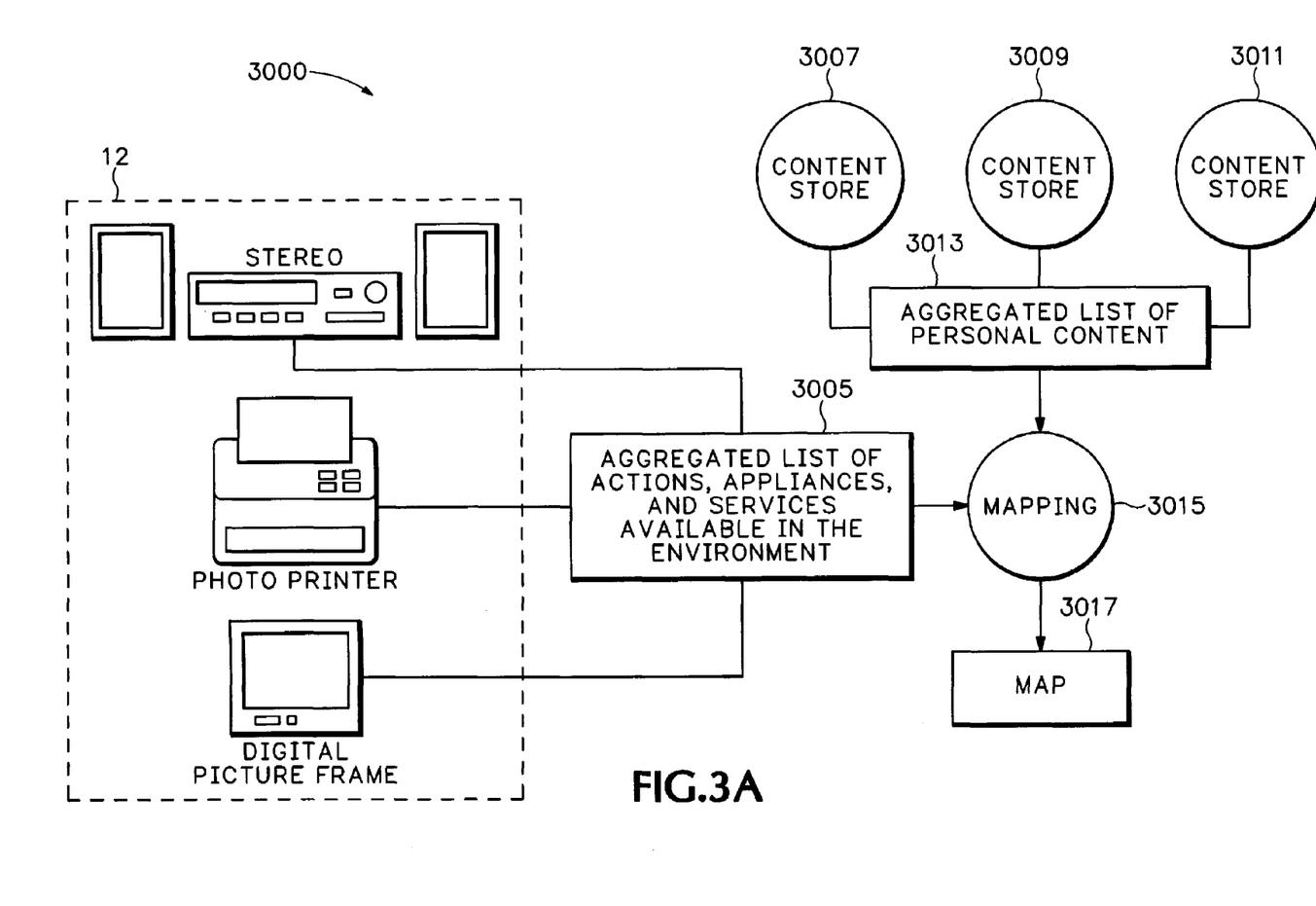
FIG. 3A is a schematic, generic system view according to an embodiment of the present invention.
Figure 3B:
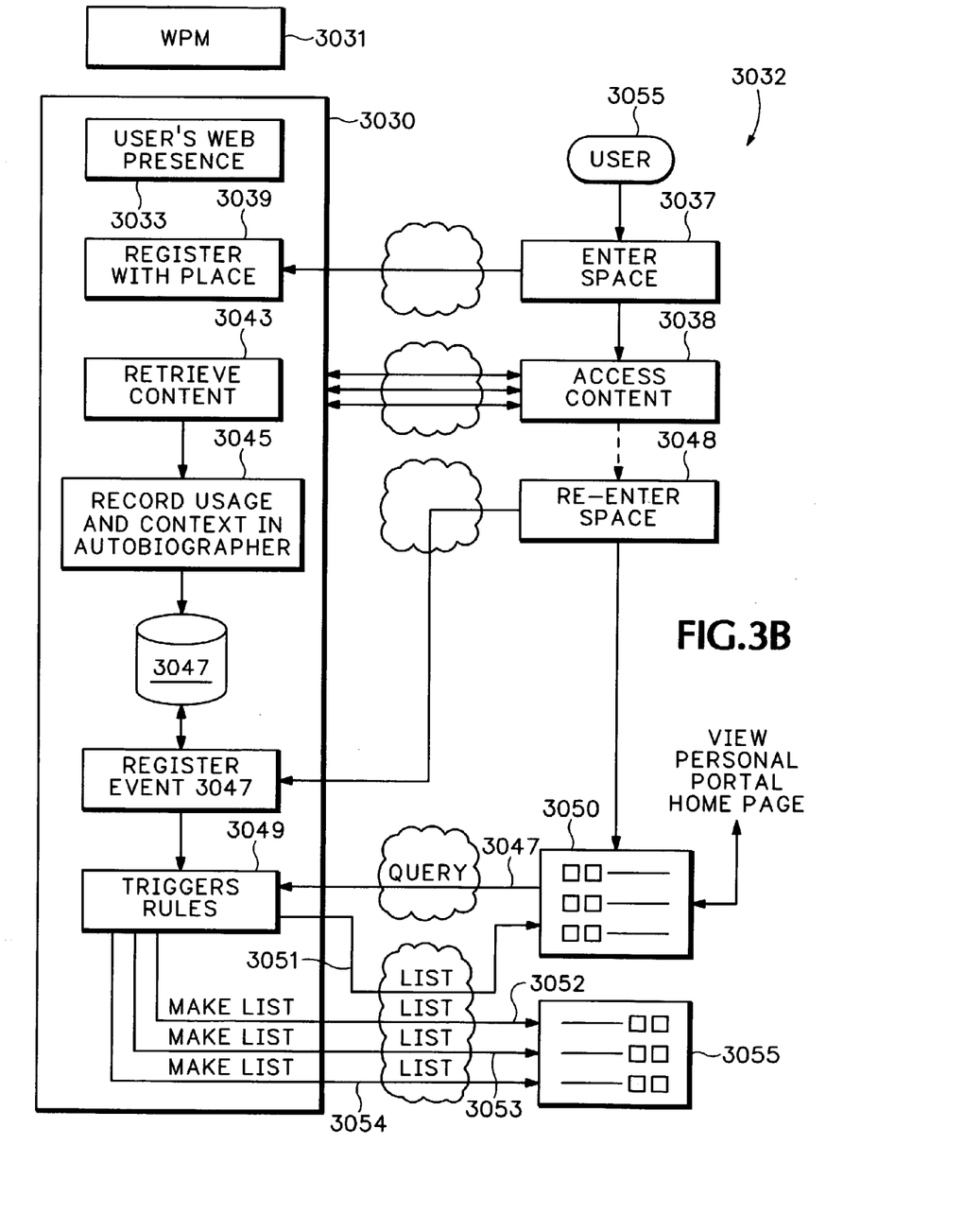
FIG. 3B is a schematic, generic operation view according to an embodiment of the present invention as illustrated in FIG. 3A.

FIG. 3A is a schematic, expanded system view 3000 wherein a web presence manager (see Appendix) is employed. Note carefully, although only one is illustrated, any number of web presence manager programs may be running simultaneously and interactively. Appliances, such as the stereo 2024, FIGS. 2A and 3A, a "photo printer," a "digital picture frame," or the like, each have an associated web presence via a web-based interface, accepting references as part of their interface. URLs of user content selection are sent to the local appliances for rendering requests. Each web-enabled appliance is responsible for retrieving the content referenced by the URL and rendering the appropriate request response. Over time, this provides an aggregated list 3005 of actions, appliances, and services available 3005 in the physical environment 12. Each user of the environment 12 will generate a personal content store 3007, 3009, 3011, namely, their individual autobiographical content use data as described with respect to FIGS. 1A, 1B, 1C and 2A. All the interactions may use references, e.g., URL's, between web present physical appliances. FIG. 3B is a schematic diagram for the interaction of each user having a content store in the system 3000 of FIG. 3A. Region 3030 represents virtual space, where the web presence manager, "WPM 3031," and each user's web presence, "user's WP 3033," resides, along with associated data management programs and accessible content. Region 3030 may be a unified or distributed network. Region 12, FIGS. 2A and 3A, represents a smart physical space with web-enabled physical appliances and physical user presences. When an enabled user 3055 enters 3037 into the smart physical space 12, his personal mobile device registers 3039 in virtual space 3030 relationally to the physical space 12. The user accesses 3038 over the web (represented by a cloud symbol) some content which is retrieved 3043 with some action returned to the user. Each such event, represented by here by three double-headed arrows traversing the web, is also recorded 3045 in context in an autobiographical metadata history, represented by the memory symbol 3047. At some later time, the same user re-enters 3048 the same space 12. Again, a registration event is triggered in which the user will be recognized as a repeat presence having a personal content associated historical metadata set 3047 for the space 12. This re-registration may automatically generate a query or may allow specific queries from such as a personal portal home page screen 3050 on the user's mobile device in accordance with triggered rules 3049 which may be tailored to each implementation. An automated return of personal content related to the current physical context is represented by arrow 3051; query specific responses are represented by arrows 3052, 3053, 3054, generating a subsidiary or subsequent screen 3055 related to the specific query 3047 or queries.

It is preferred that the web presence manager infrastructure provide a repository that has flexible interactive capabilities. A user should be able to query for content based on remembered physical context: e.g., "person present JANE; what SONG was playing in OFFICE on 09/10/2002?" Such information may be queried from the server providing the web presence manager infrastructure or in a distributed system, from JANE's content services such as in the system shown in FIG. 3A where all web presences receive event information from the environment; e.g., every time a request is sent to an appliance, each recordable person's web presence may receive a record of the event.

Looking again also to FIG. 3A, from the current personal content stores 3007, 3009, 3011, an aggregated list of personal content 3013 can be determined at any given time for the current physical environment 12. From the aggregated list of actions, appliances, and service available 3005 and the aggregated list of personal content 3013 for the user's currently present, a mapper 3015 is run in a known manner. The output of the mapper 3015 to each user currently present will be a combined mapping of content to actions of the appliances of the current physical context 3017.

Note further, that with machine learning techniques, a service can be developed wherein a subscriber can automate his surroundings in accordance with each physical environment entered, exited, and re-entered. For example, with machine learning employed, Alex's ENHANCED-PDA can automatically remember that statistically when he returns to his home from work, he has taken action to turn on the television and watch a particular news channel and, therefore, the ENHANCED-PDA can automatically implement that action for him.

Figure 4A:
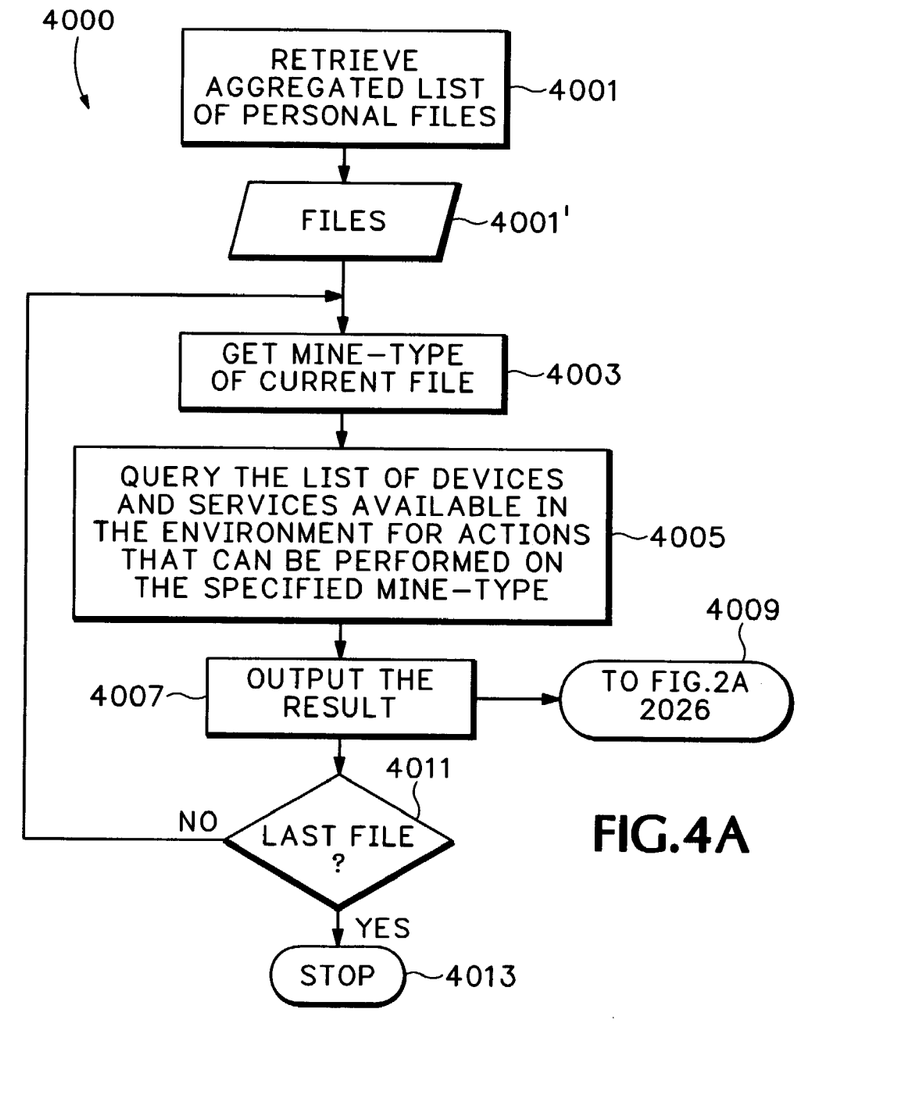
FIG. 4A is a flowchart representative of an exemplary embodiment of a mapping process as shown in FIG. 3A generically (3015 "Mapping") and in FIG. 5A (file-to-action-mapper, "FTAM," 4000).

From the combined mapping 3015, 3017 that in effect maps content to actions of appliances, a user interface is generated. Reference is also now made to FIG. 4A, one exemplary methodology 4000 for file-to-appliance-mapping (FTAM). An aggregated list of personal files associated with the user's personal web presence (see FIG. 2A, 2036) is retrieved 4001. This personal web presence listing is represented as element 4001' "FILES," likely in a data form stored in a known manner for use with associative algorithms. For each of the files of the listing 4001', the MIME-type of the file is retrieved 4003 (MIME is the known multipurpose-internet-mail-extensions internet standard; see e.g., http://hunnysoft.com/mime/, regarding the Internet Engineering Task force (IETF) documents for this standard, such as RFC-2045-2049.) The process 4000 then queries 4005 the list of devices and services available in the current environment 12 (see FIG. 2A, 3A) which are associated with actions that can be performed on the specified MIME-types 4003. The result is output 4007, 4009. If all MIME-types have been associated 4001, including if necessary to a "Not Available in Current Environment" message, icon, or the like, the process 4000 is completed 4013. Otherwise, the process loops back 4011, NO-path, for the next file.

Figure 5A:
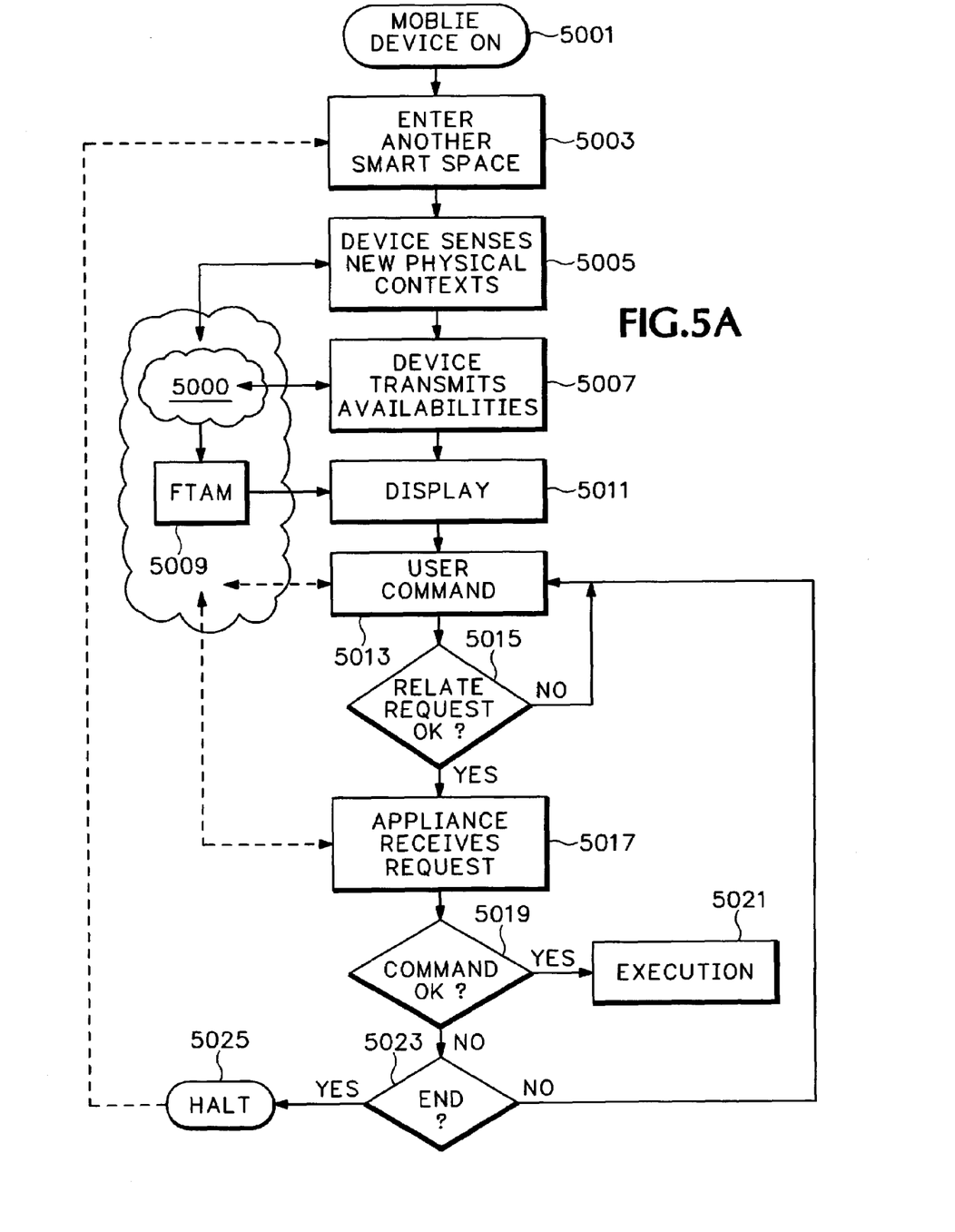
FIG. 5A is a flowchart related to an exemplary process of the embodiments shown in FIGS. 3A, 3B and 4A.
Figure 5B:
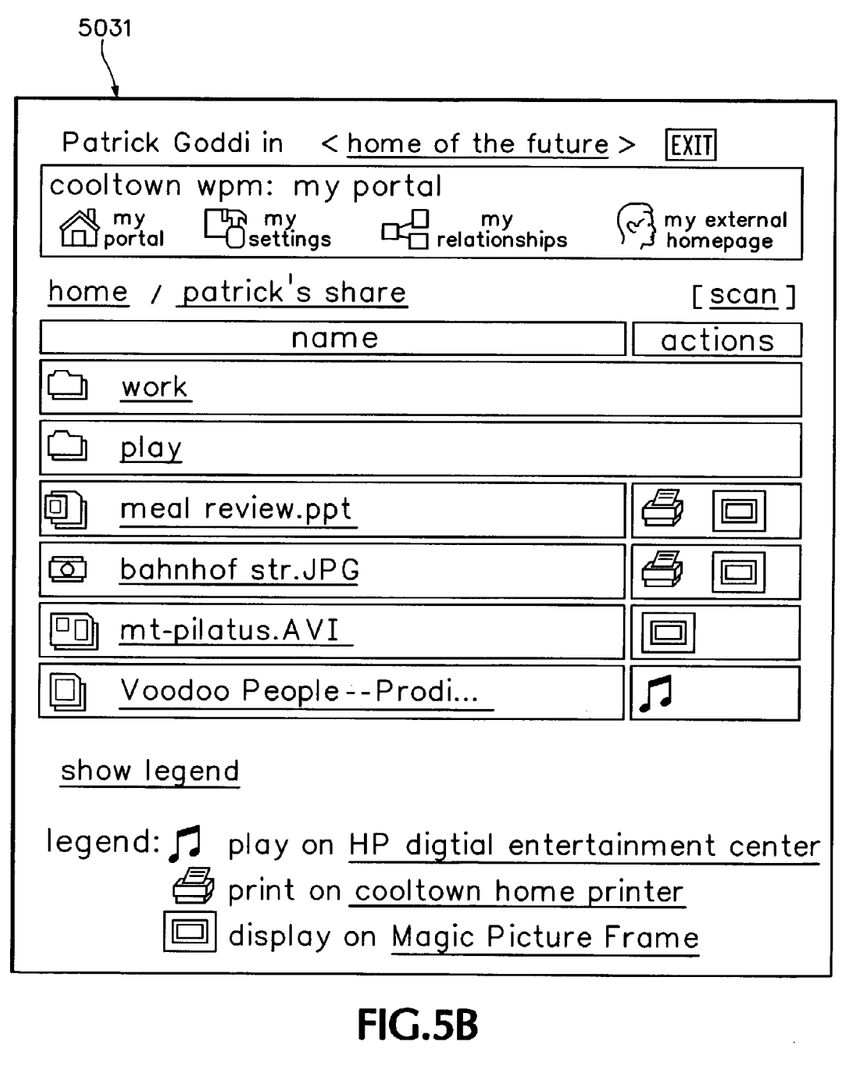
FIG. 5B is an illustration of an exemplary view screen display generated with respect to the process implemented as shown in FIGS. 3A, 3B, 4A and 5A.

An exemplary user interface 5031 is shown in FIG. 5B, illustrating a typical output 4009 graphical user interface which will be displayed on the user's mobile device. Thus, returning briefly to FIG. 2A, the user 2020 has a mobile device 2026 and needs a solution for relating each file or reference that the user has in his web presence 2036 to content-oriented appliances and services available in the user's current physical environment 12 as he moves from one such smart space to another. FIG. 5A demonstrates an exemplary embodiment of the process.

The process starts when the mobile device is turned on 5001. The user enters a smart space 5003, carrying the mobile device 2026, FIG. 2A. The device 2026 senses the new physical contexts 5005 of the current physical environment smart space, e.g., picking up various beacons as described hereinabove. As described above with respect to FIG. 2A, the user's web presence 2036 continues creating an autobiography for the user. Again, the internet or intranet is represented by the cloud symbol 5000 referred to hereinafter simply as the "network 5000."

The device 2026 is connected to the network 5000 and has access to the user's autobiographical, personal files aggregated over time from various sources and various smart spaces as described hereinabove. The space 12 (e.g., FIGS. 2A and 3A) is equipped with appliances and services that perform specific actions—e.g., print, display, render audio, write to removable media, and the like—on a set of standard file types—e.g., JPEG or MPEG images, MP3 audio, WORD™ documents, PowerPoint™ slides, and the like. The device thus having discovered the available appliances and services of the new physical context now transmits 5007 the information regarding the availability of each appliance and service of the current physical context to the network 5000.

A network application such as that described in the Appendix stores the capabilities of the various appliances for use by the user. In addition to local capabilities, this application maintains information about capabilities that are relevant to the specific user. These are shown in FIG. 3A with the mapping between the elements 3015 to produce a map 3017 relating content to actions of appliances. This mapping module 5009 is also shown as element 4000, FTAM, file-to-action-mapper, FIG. 4A. Thus, as described above with respect to FIG. 4A, the FTAM 4000 generates a map which is presented on the mobile device as a display 5011, where again FIG. 5B is an embodiment of an exemplary display 5031. Thus, on the mobile device viewscreen a graphic user interface is provided showing the files and current environment actions available in an associative form. The interface created to display the associative mapping to the user can be a known manner web interface, i.e., a known manner browser compatible with the network system.

Using the viewscreen display 5011, 5031 as a guide and the mobile device 2026 in the manner of a "remote control for the smart space," the user issues a command 5013. Looking to FIG. 5B, the user may for example choose the MIME-type for the MP3 file that plays the "Voodoo People" song, or album of songs, found in the file represented by that "name" listing. The associative mapping for the present environment happens to have the stereo 2024 (FIG. 2A). The user selects the action of playing the MP3 file by clicking on the "♫" icon representing the stereo. Thus, in general, assuming issued the command is executable, 5015 YES-path, the apparatus will receive the command request 5017. Assuming the command is proper, 5019 YES-path, the command is executed 5021.

If the user is finished, 5023 YES-path, adjusting the current physical context or has retrieved the information desired with respect to the current physical context, the process halts 5025 until the device is transported to another smart space, indicated by the phantom return line to element 5003.

Thus, when a user selects a given file from the list, the action that should be performed is associated therewith. When the user selects an action, the file is sent to the device, or service, using a network protocol, such as HTTP, and the device performs the corresponding action on the file. Each action provides a description available on the network so that it can be discovered. This description must include the URL of its HTTP API so that a file can be sent to it. It may also include the types of files the action accepts as well as the types of files it rejects. Note that the FTAM may then use this information to refine the mapping between files and actions for future processing.

Thus, recordal, storage, query and retrieval for personal content in associative relationship to a specific physical context is historically created, maintained, and used. This provides a smart bridging between the physical, web-enabled world and the virtual world of associated web presences. Associative mapping between the user's personal web presence files and current environment appliance and service availabilities via a common network permits the use of networked available resources via a mobile device without the need for including all the driver programs and the like needed to use the resources within the mobile device itself.

In other words, instead of a computer-centric system, in a basic aspect the present invention provides a user-centric system which advises as to content-oriented appliances and services available in the user's current physical environment associated with the user's web presence files.

Note that while the embodiments described herein are discussed with respect to smart physical environments, the invention recognizes an extension of "physical context" wherein it may also include specific virtual environments in which a virtual presence and virtual personal content events can be established repeatedly.

The foregoing description of exemplary and preferred embodiments has been presented for purposes of illustration and description. It is not intended to be exhaustive or to limit the invention to the precise form or to the embodiments disclosed. The possibility of modifications and variations will be apparent to practitioners skilled in this art. Similarly, any process steps described might be interchangeable with other steps in order to achieve the same result. The embodiments were chosen and described in order to best explain the principles of the invention and its best mode of practical application, thereby to enable others skilled in the art to understand how it may be suited for a particular use or implementation contemplated. It is intended that the scope of the invention be defined by the claims appended hereto and their equivalents. Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . ."

What is claimed is:

1. A method of enabling display of a view to a user of content media organized by relevancy to a smart space physical context based on autobiographical media requests made previously in the same smart space physical context in a computerized network, wherein said smart space physical context is represented as a network presence and comprises at least one network-enabled appliance physically connected to the network, the method comprising:
    enabling an enhanced mobile device associated with said network, the enhanced mobile device storing a personal web presence of a user;
    using said enhanced mobile device, recognizing appliance-related network presences for the at least one network-enabled appliance;
    transmitting representations of said appliance-related network presences to a mapping resource on said network;
    using said mapping resource, associating each of said network presences with personal content files associated with the personal web presence of the user of said enhanced mobile device;
    displaying a map on said mobile device wherein said map provides a correlation between said personal content files and actions each of said appliances can perform thereon such that a user of said mobile device can select one or more of said actions; and
    using said device, sending a request for content media accessible over the network to an appliance-related network presence for display, execution or play by an appliance associated with the appliance-related network presence;
    creating an autobiography of the media request by storing current context information associated with the request wherein the current context information includes a presence of another user as indicated by his network presence in the smart space physical context when the request was made;
    the personal web presence of the user stores the autobiography of the media request associated with the user's personal web presence; and
    responsive to the user re-entering the same smart space physical context at a later time, displaying on the enhanced mobile device a view of a list of content media that was requested in a previous time period in the same smart space physical context based on similarity of the current context information with context information stored in the autobiography of the requested content media of the previous time period.

2. The method as set forth in claim 1, said associating further comprising:
    retrieving an aggregated list of personal content files associated with said user;
    sequentially selecting a representation for each of said files; and
    sequentially comparing each of said representations with a list of appliances and services available in the current environment for actions that can be performed on each for making said correlation.

3. The method as set forth in claim 2 wherein said list of appliances and services available has a description on said network including a uniform resource locator for each.

4. A smart space network comprising:
    a smart space physical context having network-enabled appliances therein, the smart space physical context being represented by a web presence and each of said network-enabled appliances being represented by a web presence;
    a mobile computing device, having enhancements for recognizing the web presence of the smart space physical context and the web presences of the network-enabled appliances, said mobile device including a personal web presence executable representation for a user which communicates via the network with the web presence of the physical context, the web presences of the network-enabled appliances, and any personal web presences of other users present using said mobile device, recognizing appliance-related network presences for the at least one network-enabled appliance;
    transmitting representations of said appliance-related network presences to a mapping resource on said network;
    using said mapping resource, associating each of said network presences with personal content files associated with the personal web presence of the user of said enhanced mobile device;
    displaying a map on said mobile device wherein said map provides a correlation between said personal content files and action each of said appliances can perform thereon such that a user of said mobile device can select one or more of said actions;
    for each user of said network, a user-related content store on said network having user-related content files;
    on said network, a file-to-action-mapper for sending to said device a set of interactive representations associating said user-related content files to network-enabled appliances in a current time period for the smart space physical context in which the device is located; and
    wherein responsive to user input, the personal web presence of the user executing on the mobile device, sends a request for content media accessible over the network to an appliance-related network presence for display, execution or play by an appliance associated with the appliance-related network presence, creates an autobiography of the media request by storing current context information about the web presences represented in the smart space physical context at the time of the request, including any web presence of another user as indicated by his network presence in the smart space physical context, stores the autobiography of the media request, and responsive to the user re-entering the same smart space physical context at later time, displaying on the mobile device a view of a list of content media that was requested in a previous time period in the same smart space physical context based on similarity of the current context information with context information stored in the autobiographies of requested content media of the previous time period.

* * * * *

UNITED STATES PATENT AND TRADEMARK OFFICE
CERTIFICATE OF CORRECTION

PATENT NO. : 7,233,990 B1
APPLICATION NO. : 10/347999
DATED : June 19, 2007
INVENTOR(S) : Philippe Debaty et al.

It is certified that error appears in the above-identified patent and that said Letters Patent is hereby corrected as shown below:

In column 5, line 67, delete "Hewlett-Packardt™" and insert -- Hewlett-Packard$^{TM}$ --, therefor.

In column 12, line 45, in Claim 4, alter "present" insert -- ; --.

In column 14, line 7, in Claim 4, delete "autobiographies" and insert -- autobiography --, therefor.

Signed and Sealed this

Twenty-fourth Day of November, 2009

David J. Kappos
*Director of the United States Patent and Trademark Office*